(12) United States Patent
Gaal et al.

(10) Patent No.: US 10,681,652 B2
(45) Date of Patent: Jun. 9, 2020

(54) POWER CONTROL FOR DUAL RADIO ACCESS TECHNOLOGY (RAT) COMMUNICATION

(71) Applicant: QUALCOMM Incorporated, San Diego, CA (US)

(72) Inventors: Peter Gaal, San Diego, CA (US); Xiao Feng Wang, San Diego, CA (US); Yang Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/199,982

(22) Filed: Nov. 26, 2018

(65) Prior Publication Data

US 2019/0166565 A1 May 30, 2019

Related U.S. Application Data

(60) Provisional application No. 62/591,688, filed on Nov. 28, 2017.

(51) Int. Cl.
*H04W 52/16* (2009.01)
*H04W 52/34* (2009.01)
(Continued)

(52) U.S. Cl.
CPC ......... *H04W 52/346* (2013.01); *H04L 1/1812* (2013.01); *H04L 5/0053* (2013.01);
(Continued)

(58) Field of Classification Search
CPC . H04W 52/346; H04W 52/146; H04W 52/16; H04W 52/365; H04W 52/367;
(Continued)

(56) References Cited

U.S. PATENT DOCUMENTS

| 8,514,794 B2 * | 8/2013 | Zhang | H04W 52/286 370/329 |
| 8,521,207 B2 * | 8/2013 | Zhang | H04W 52/286 455/522 |

(Continued)

OTHER PUBLICATIONS

China Telecom: "Discussion on Power Sharing for NR-LTE Co-existence," 3GPP Draft; R1-1717739 Discussion on Power Sharing for NR-LTE Co-Existence, 3rd Generation Partnership Project (3GPP), Mobile Competence Centre; 650, Route Des Lucioles; F-06921 Sophia-Antipolis Ced, vol. RAN WG1, No. Prague, CZ; Oct. 9, 2017-Oct. 13, 2017, Oct. 8, 2017, XP051340924, Retrieved from the Internet: URL: http://www.3gpp.org/ftp/Meetings_3GPP_SYNC/RAN1/Docs/ [retrieved on Oct. 8, 2017].

(Continued)

*Primary Examiner* — Hai V Nguyen
(74) *Attorney, Agent, or Firm* — Patterson & Sheridan, LLP

(57) ABSTRACT

Certain aspects of the present disclosure relate to methods and apparatus for power control. For example, a method is provided for wireless communication by a user equipment that includes determining whether a sum of a first power limit for communicating on an uplink associated with a first radio access technology and a second power limit for communicating on an uplink associated with a second radio access technology is greater than an overall power limit for communicating on uplinks by the user equipment. The method further includes scaling down power used for a transmission on the uplink associated with the first radio access technology during the first time or dropping a transmission on the uplink associated with the first radio access technology during the first time when the sum is greater than the overall power limit.

17 Claims, 10 Drawing Sheets

(51) Int. Cl.
*H04W 52/14* (2009.01)
*H04W 52/36* (2009.01)
*H04W 88/06* (2009.01)
*H04W 72/04* (2009.01)
*H04L 1/18* (2006.01)
*H04W 52/38* (2009.01)
*H04L 5/00* (2006.01)
*H04L 5/14* (2006.01)
*H04W 52/28* (2009.01)
*H04W 72/12* (2009.01)
*H04L 1/16* (2006.01)

(52) U.S. Cl.
CPC ......... *H04L 5/0094* (2013.01); *H04W 52/146* (2013.01); *H04W 52/16* (2013.01); *H04W 52/365* (2013.01); *H04W 52/367* (2013.01); *H04W 52/38* (2013.01); *H04W 72/0473* (2013.01); *H04W 88/06* (2013.01); H04L 1/1671 (2013.01); H04L 1/1896 (2013.01); H04L 5/1469 (2013.01); H04W 52/281 (2013.01); H04W 52/34 (2013.01); H04W 72/1215 (2013.01)

(58) Field of Classification Search
CPC   H04W 52/38; H04W 72/0473; H04L 1/1812; H04L 5/0053; H04L 5/0094
USPC ........................................................ 455/522
See application file for complete search history.

(56) References Cited

U.S. PATENT DOCUMENTS

| | | | | |
|---|---|---|---|---|
| 8,718,696 | B2* | 5/2014 | Yavuz | H04W 52/146 370/252 |
| 8,767,869 | B2* | 7/2014 | Rimini | H04B 1/109 370/334 |
| 9,008,050 | B2* | 4/2015 | Feuersanger | H04W 52/281 370/336 |
| 9,055,544 | B2* | 6/2015 | Worrall | H04W 52/367 |
| 9,386,490 | B2* | 7/2016 | Dinan | H04W 76/27 |
| 9,674,800 | B2* | 6/2017 | Zhang | H04W 52/346 |
| 9,736,795 | B2* | 8/2017 | Dinan | H04W 52/34 |
| 9,843,982 | B2* | 12/2017 | Dinan | H04W 76/27 |
| 10,236,951 | B2* | 3/2019 | Park | H04B 7/04 |
| 10,299,225 | B2* | 5/2019 | Gulati | H04W 52/367 |
| 10,327,195 | B2* | 6/2019 | Dinan | H04W 76/27 |
| 10,341,961 | B2* | 7/2019 | Cheng | H04W 88/10 |
| 10,349,361 | B2* | 7/2019 | Feuersaenger | H04W 74/004 |
| 10,356,724 | B2* | 7/2019 | Lee | H04W 52/346 |
| 10,367,677 | B2* | 7/2019 | Parkvall | H04L 41/0233 |
| 10,368,322 | B2* | 7/2019 | Dinan | H04W 52/54 |
| 10,375,655 | B2* | 8/2019 | Dinan | H04W 76/27 |
| 10,383,068 | B2* | 8/2019 | Dinan | H04W 56/0005 |
| 10,477,492 | B2* | 11/2019 | Seo | H04W 72/0473 |
| 10,516,513 | B2* | 12/2019 | Grant | H04L 1/1614 |
| 10,524,244 | B2* | 12/2019 | Tsai | H04W 72/042 |
| 10,524,294 | B2* | 12/2019 | Babaei | H04W 74/002 |
| 2009/0046596 | A1* | 2/2009 | Ewe | H04W 36/0033 370/252 |
| 2009/0197632 | A1* | 8/2009 | Ghosh | H04W 52/24 455/522 |
| 2009/0286545 | A1* | 11/2009 | Yavuz | H04W 52/146 455/452.1 |
| 2010/0202331 | A1* | 8/2010 | Zhang | H04W 52/346 370/310 |
| 2010/0238825 | A1* | 9/2010 | Zhang | H04W 52/286 370/252 |
| 2010/0273471 | A1* | 10/2010 | Meshkati | H04W 16/16 455/422.1 |
| 2010/0322090 | A1* | 12/2010 | Zhang | H04W 52/346 370/252 |
| 2012/0020286 | A1* | 1/2012 | Damnjanovic | H04W 52/281 370/328 |
| 2012/0270519 | A1* | 10/2012 | Ngai | H04W 52/367 455/404.1 |
| 2012/0270592 | A1* | 10/2012 | Ngai | H04W 52/226 455/522 |
| 2013/0044791 | A1* | 2/2013 | Rimini | H04B 1/109 375/219 |
| 2013/0116002 | A1* | 5/2013 | Kim | H04W 52/146 455/522 |
| 2013/0176953 | A1* | 7/2013 | Stern-Berkowitz | H04W 52/146 370/329 |
| 2014/0113630 | A1* | 4/2014 | Vangala | H04W 36/26 455/436 |
| 2014/0187282 | A1* | 7/2014 | Sankaran | H04W 52/343 455/522 |
| 2015/0087296 | A1* | 3/2015 | Kim | H04W 52/365 455/422.1 |
| 2016/0337018 | A1* | 11/2016 | Hwang | H04L 5/003 |
| 2017/0331577 | A1* | 11/2017 | Parkvall | H04L 5/0053 |
| 2017/0331670 | A1* | 11/2017 | Parkvall | H04W 52/0245 |
| 2017/0332359 | A1* | 11/2017 | Tsai | H04B 7/0639 |
| 2018/0035385 | A1* | 2/2018 | Lee | H04B 7/2615 |
| 2018/0049222 | A1* | 2/2018 | Manolakos | H04W 72/1263 |
| 2018/0062707 | A1* | 3/2018 | Chen | H04B 1/0057 |
| 2018/0098292 | A1* | 4/2018 | Gulati | H04W 52/267 |
| 2018/0102817 | A1* | 4/2018 | Park | H04B 7/04 |
| 2018/0124711 | A1* | 5/2018 | Hosseini | H04W 52/42 |
| 2018/0234980 | A1* | 8/2018 | Li | H04W 72/082 |
| 2018/0269939 | A1* | 9/2018 | Hu | H04B 7/0456 |
| 2018/0279227 | A1* | 9/2018 | Kim | H04W 52/281 |
| 2018/0324708 | A1* | 11/2018 | Cheng | H04W 52/146 |
| 2018/0332539 | A1* | 11/2018 | Fan | H04W 52/367 |
| 2018/0368083 | A1* | 12/2018 | Yang | H04B 7/0486 |
| 2019/0007910 | A1* | 1/2019 | Akula | H04L 5/0082 |
| 2019/0028980 | A1* | 1/2019 | Feuersaenger | H04W 72/0413 |
| 2019/0037560 | A1* | 1/2019 | Huang | H04W 52/325 |
| 2019/0044681 | A1* | 2/2019 | Zhang | H04L 5/0032 |
| 2019/0045456 | A1* | 2/2019 | Seo | H04W 52/243 |
| 2019/0052339 | A1* | 2/2019 | Zhou | H04B 7/0695 |
| 2019/0053242 | A1* | 2/2019 | Akula | H04L 5/001 |
| 2019/0081657 | A1* | 3/2019 | Zeng | H04B 1/711 |
| 2019/0081679 | A1* | 3/2019 | Davydov | H04B 7/0626 |
| 2019/0097710 | A1* | 3/2019 | Park | H04B 7/0478 |
| 2019/0097773 | A1* | 3/2019 | Grant | H04L 1/1614 |
| 2019/0103944 | A1* | 4/2019 | Wu | H04L 1/1835 |
| 2019/0104476 | A1* | 4/2019 | Lim | H04W 52/146 |
| 2019/0104480 | A1* | 4/2019 | Hasholzner | H04W 52/228 |
| 2019/0116560 | A1* | 4/2019 | Naderializadeh | H04W 52/346 |
| 2019/0116611 | A1* | 4/2019 | Lee | H04W 72/1278 |
| 2019/0124648 | A1* | 4/2019 | Sun | H04W 28/08 |
| 2019/0132096 | A1* | 5/2019 | Abedini | H04L 1/0026 |
| 2019/0132805 | A1* | 5/2019 | Abedini | H04L 1/0026 |
| 2019/0149379 | A1* | 5/2019 | Xiong | H04L 27/2613 370/329 |
| 2019/0158155 | A1* | 5/2019 | Park | H04B 7/04 |
| 2019/0159134 | A1* | 5/2019 | Wang | H04L 5/0094 |
| 2019/0159140 | A1* | 5/2019 | Wang | H04W 52/346 |
| 2019/0182682 | A1* | 6/2019 | Kim | H04W 16/28 |
| 2019/0215119 | A1* | 7/2019 | Kim | H04W 74/0833 |
| 2019/0222402 | A1* | 7/2019 | Yang | H04W 72/0446 |
| 2019/0260530 | A1* | 8/2019 | Yi | H04L 5/0044 |
| 2019/0261290 | A1* | 8/2019 | Gulati | H04W 52/283 |
| 2019/0268088 | A1* | 8/2019 | Grant | H04B 7/0417 |
| 2019/0273644 | A1* | 9/2019 | Xiong | H04L 5/006 |
| 2019/0274153 | A1* | 9/2019 | Park | H04L 5/0053 |
| 2019/0320337 | A1* | 10/2019 | Siomina | H04W 24/10 |
| 2019/0342838 | A1* | 11/2019 | Kwak | H04L 5/0082 |
| 2019/0356524 | A1* | 11/2019 | Yi | H04B 7/0617 |
| 2019/0379492 | A1* | 12/2019 | Chang | H04W 72/042 |
| 2019/0386797 | A1* | 12/2019 | Yang | H04W 72/0446 |

(56) References Cited

U.S. PATENT DOCUMENTS

2019/0387578 A1* 12/2019 Shrestha .............. H04L 5/0082
2020/0008154 A1* 1/2020 Dinan ................ H04W 52/365

OTHER PUBLICATIONS

Ericsson CATT Samsung Mediatek Nokia NSB: "Way Forward on Power Sharing for LTE-NR NSA Operation," 3GPP Draft; R1-1715185_LTE_NR_Power_Sharing_V0, 3rd Generation Partnership Project (3GPP) Mobile Competence Centre; 650, Route Des Lucioles; F-06921 Sophia-Antipolis Cedex; France, vol. RAN WG1, No. Prague, Czech Republic; Aug. 21, 2017-Aug. 25, 2017.3gpp.org/ftp/tsg_ran/WG1_RL1/TSGR1_90/Docs/ [retrieved on Aug. 26, 2017.
Ericsson: "Power Sharing for LTE-NR Dual Connectivity," 3GPP Draft; R1-1714460_LTE_NR_Power_Sharing_V0, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Aug. 21, 2017-Aug. 25, 2017, Aug. 20, 2017, XP051317238, Retrieved from the Internet: URL: http://www.3gpp.org/ftp/Meetings_3GPP_SYNC/RAN1/Docs/ [retrieved on Aug. 20, 2017].
Interdigital et al: "Power Sharing Mechanisms with LTE-NR DC and NR," 3GPP Draft; R1-1714118 (R15 NR WI AI 6171 Power Sharing), 3rd Generation Partnership Project (3GPP), Mobile Competence Centre; 650, Route Des Lucioles; F-06921 Sophia-Antipolis Cedex; France, vol. RAN WG1, No. Prague, Czech Republic; Aug. 21, 2017-Aug. 25, 2017, Aug. 20, 2017, XP051316907, 7 pages, Retrieved from the Internet: URL: http://www.3gpp.org/ftp/Meetings_3GPP_SYNC/RAN1/Docs/ [retrieved on Aug. 20, 2017].
International Search Report and Written Opinion—PCT/US2018/062597—ISA/EPO—dated Feb. 15, 2019.

* cited by examiner

POWER CONTROL FOR DUAL RADIO ACCESS TECHNOLOGY (RAT) COMMUNICATION

CROSS-REFERENCE TO RELATED APPLICATIONS

This application claims the benefit of U.S. Provisional Patent No. 62/591,688, filed Nov. 28, 2017. The content of the provisional application is hereby incorporated by reference in its entirety.

FIELD

The present disclosure relates generally to communication systems, and more particularly, to methods and apparatus for power control.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, Next Generation Node B (gNB), etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communication. The method generally includes scheduling a user equipment to communicate on an uplink associated with a first radio access technology in any uplink transmission time of a plurality of uplink transmission times based on the user equipment having a first power limit for communicating on the uplink associated with the first radio access technology and a second power limit for communication on an uplink associated with the second radio access technology, wherein the sum of the first power limit and the second power limit is less than or equal to an overall power limit for communication on uplinks. The method further includes communicating with the user equipment on the uplink associated with the first radio access technology in an uplink transmission time designated for the second radio access technology.

Certain aspects of the present disclosure provide a method for wireless communication. The method generally includes scheduling a user equipment to communicate on an uplink associated with a first radio access technology only on uplink transmission times of a plurality of uplink transmission times not designated for the second radio access technology based on the user equipment having a first power limit for communicating on the uplink associated with the first radio access technology and a second power limit for communication on an uplink associated with the second radio access technology, wherein the sum of the first power limit and the second power limit is greater than an overall power limit for communication on uplinks. The method further includes communicating with the user equipment on the uplink associated with the first radio access technology in an uplink transmission time not designated for the second radio access technology.

Certain aspects of the present disclosure provide a method for wireless communication by a user equipment. The method generally includes receiving, at the user equipment, information indicating scheduling of the user equipment to communicate on both an uplink associated with a first radio access technology and on an uplink associated with a second radio access technology at a first time, the user equipment having a first power limit for communicating on the uplink associated with the first radio access technology and a second power limit for communicating on the uplink associated with the second radio access technology. The method further includes determining whether a sum of the first power limit and the second power limit is greater than an overall power limit for communicating on uplinks by the user equipment. The method further includes communicating, by the user equipment, on the uplink associated with the second radio access technology based on the second power limit during the first time. The method further includes scaling down power used for a transmission on the uplink associated with the first radio access technology during the first time or dropping a transmission on the uplink associated with the first radio access technology during the first time when the sum is greater than the overall power limit.

Certain aspects of the present disclosure provide a user equipment including a memory and a processor coupled to the memory. The processor is configured to receive information indicating scheduling of the user equipment to communicate on both an uplink associated with a first radio access technology and on an uplink associated with a second radio access technology at a first time, the user equipment having a first power limit for communicating on the uplink associated with the first radio access technology and a second power limit for communicating on the uplink associated with the second radio access technology. The processor is further configured to determine whether a sum of the first power limit and the second power limit is greater than an overall power limit for communicating on uplinks by the user equipment. The processor is further configured to communicate on the uplink associated with the second radio access technology based on the second power limit during the first time. The processor is further configured to scale down power used for a transmission on the uplink associated with the first radio access technology during the first time or drop a transmission on the uplink associated with the first radio access technology during the first time when the sum is greater than the overall power limit.

Certain aspects of the present disclosure provide a user equipment. The user equipment generally includes means for receiving information indicating scheduling of the user equipment to communicate on both an uplink associated with a first radio access technology and on an uplink associated with a second radio access technology at a first time, the user equipment having a first power limit for communicating on the uplink associated with the first radio access technology and a second power limit for communicating on the uplink associated with the second radio access technology. The user equipment further includes means for determining whether a sum of the first power limit and the second power limit is greater than an overall power limit for communicating on uplinks by the user equipment. The user equipment further includes means for communicating on the uplink associated with the second radio access technology based on the second power limit during the first time. The user equipment further includes means for scaling down power used for a transmission on the uplink associated with the first radio access technology during the first time or dropping a transmission on the uplink associated with the first radio access technology during the first time when the sum is greater than the overall power limit.

Certain aspects of the present disclosure provide a non-transitory computer readable storage medium that stores instructions that when executed by a user equipment (UE) causes the UE to perform a method for wireless communication. The method generally includes receiving, at the user equipment, information indicating scheduling of the user equipment to communicate on both an uplink associated with a first radio access technology and on an uplink associated with a second radio access technology at a first time, the user equipment having a first power limit for communicating on the uplink associated with the first radio access technology and a second power limit for communicating on the uplink associated with the second radio access technology. The method further includes determining whether a sum of the first power limit and the second power limit is greater than an overall power limit for communicating on uplinks by the user equipment. The method further includes communicating, by the user equipment, on the uplink associated with the second radio access technology based on the second power limit during the first time. The method further includes scaling down power used for a transmission on the uplink associated with the first radio access technology during the first time or dropping a transmission on the uplink associated with the first radio access technology during the first time when the sum is greater than the overall power limit.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
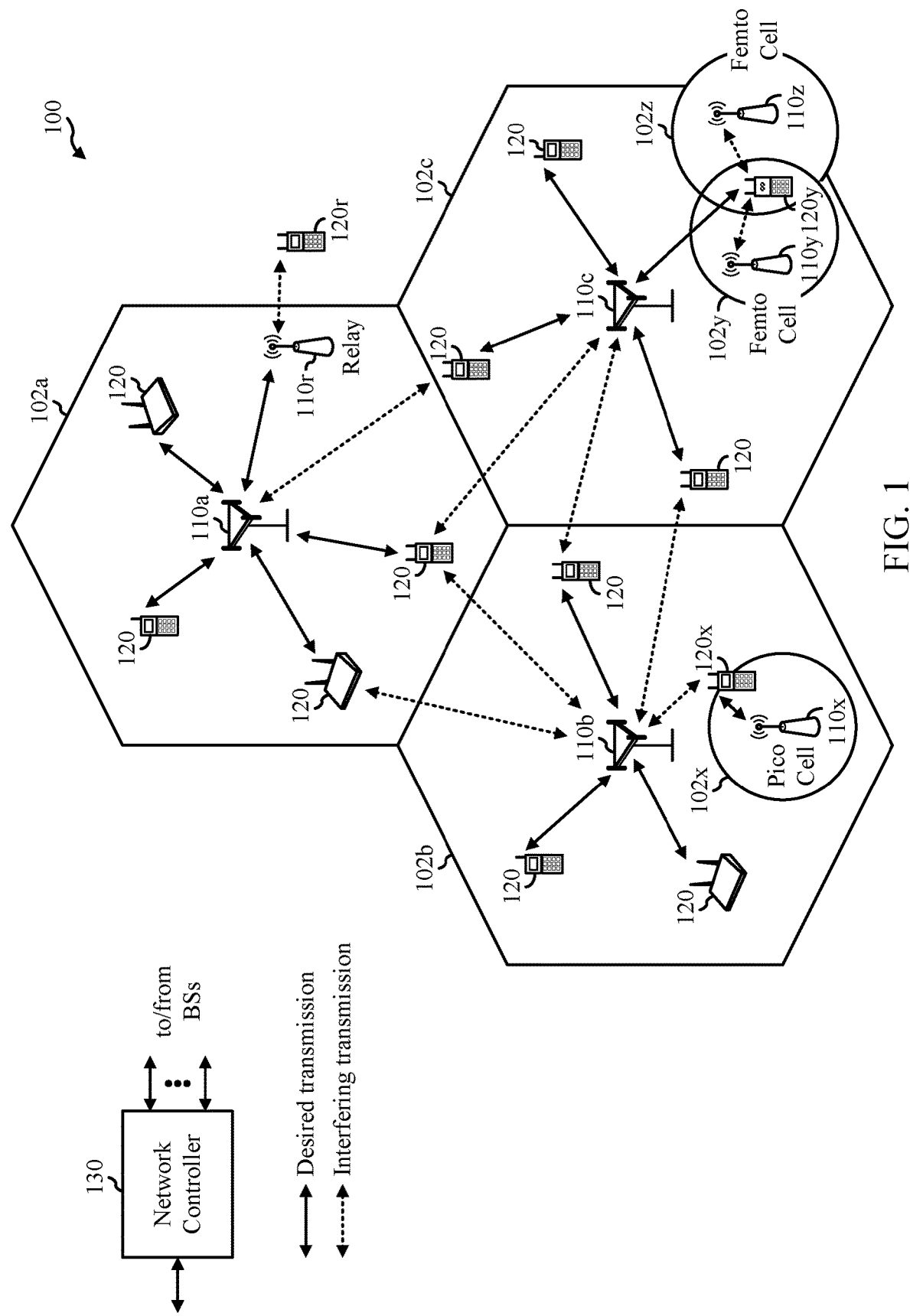
FIG. 1 is a block diagram conceptually illustrating an example telecommunications system, in which aspects of the present disclosure may be performed.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). "LTE" refers generally to LTE, LTE-Advanced (LTE-A), LTE in an unlicensed spectrum (LTE-whitespace), etc. The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, gNB, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a healthcare device, a biometric sensor/device, a wearable device such as a smart watch, smart clothing, smart glasses, virtual reality goggles, a smart wrist band, smart jewelry (e.g., a smart ring, a smart bracelet, etc.), an entertainment device (e.g., a music device, a video device, a satellite radio, etc.), a vehicular component or sensor, a smart meter/sensor, a robot, a drone, industrial manufacturing equipment, a positioning device (e.g., GPS, Beidou, terrestrial), or any other suitable device that is configured to communicate via a wireless or wired medium. Some UEs may be considered machine-type communication (MTC) devices or evolved MTC (eMTC) devices, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. MTC and eMTC UEs include, for example, robots, drones, remote devices, sensors, meters, monitors, cameras, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. MTC UEs, as well as other UEs, may be implemented as Internet-of-Things (IoT) devices, e.g., narrowband IoT (NB-IoT) devices.

In FIG. 1, a solid line with double arrows indicates desired transmissions between a UE and a serving BS, which is a BS designated to serve the UE on the downlink (DL) and/or uplink (UL). A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (e.g., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
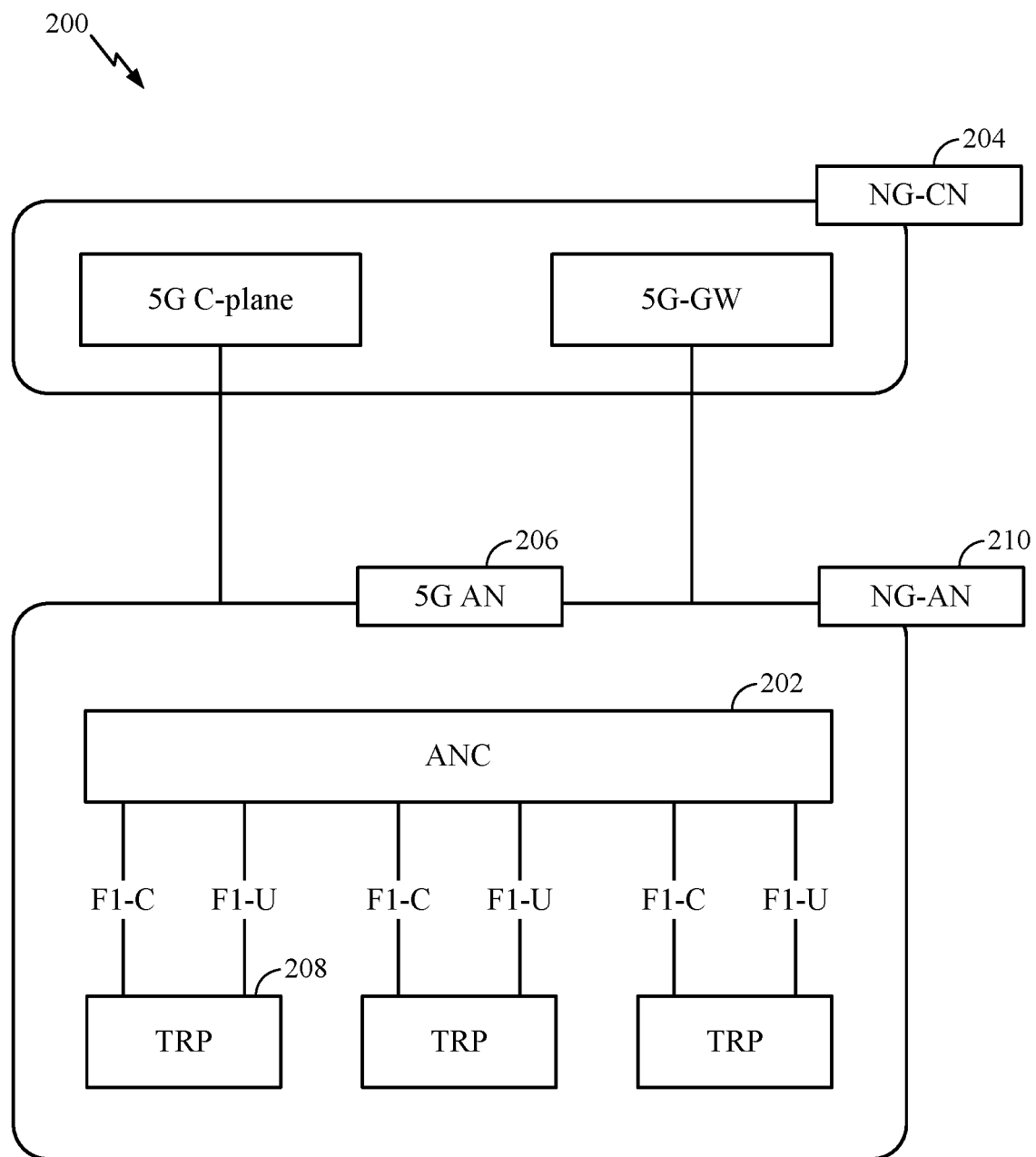
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, gNBs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
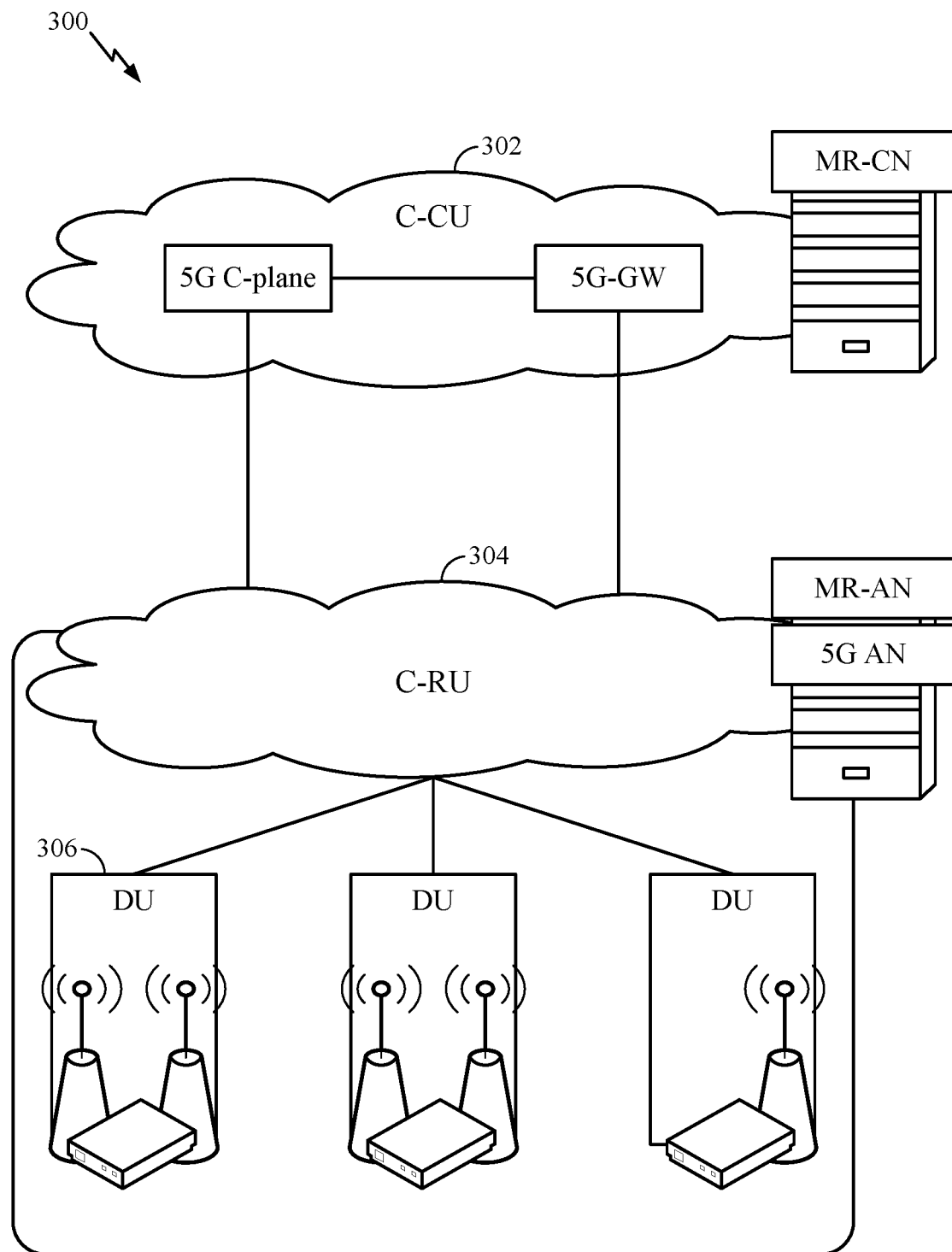
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
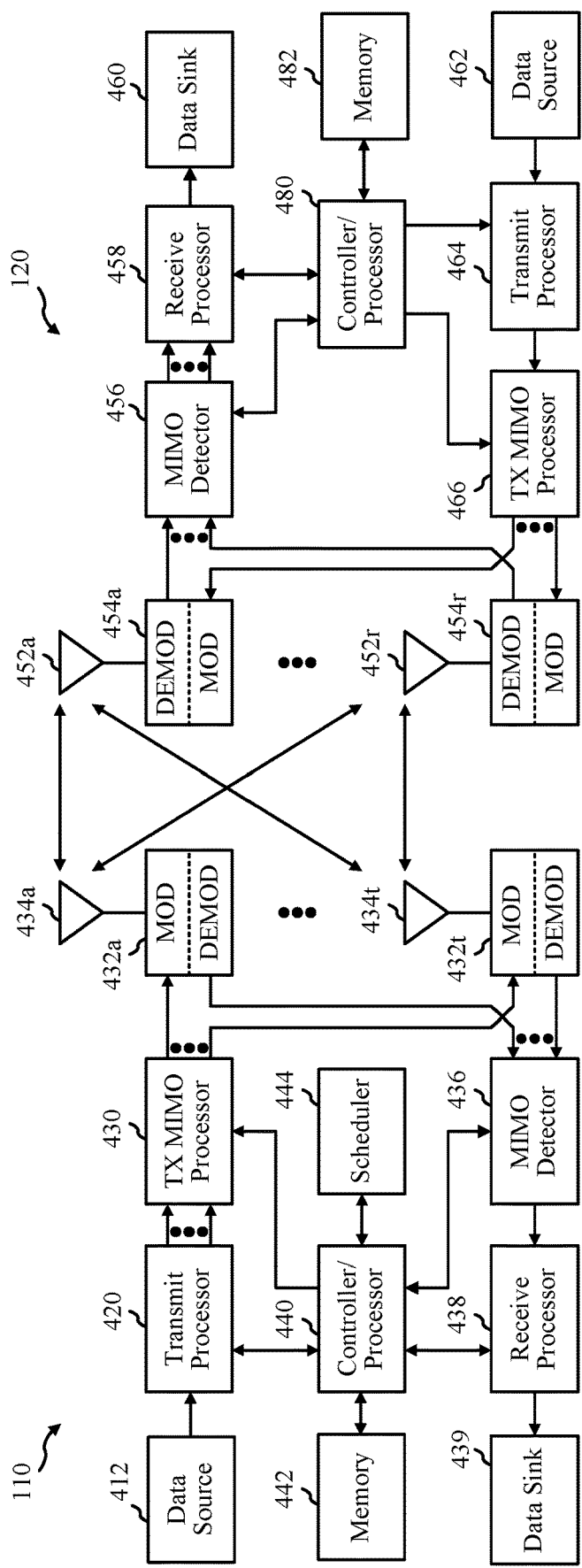
FIG. 4 is a block diagram conceptually illustrating a design of an example base station (BS) and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 420, 438, and/or controller/processor 440 of the BS 110 may be used to perform the operations described herein and illustrated.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in distributed units. For example, some Tx/Rx processing can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct the processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
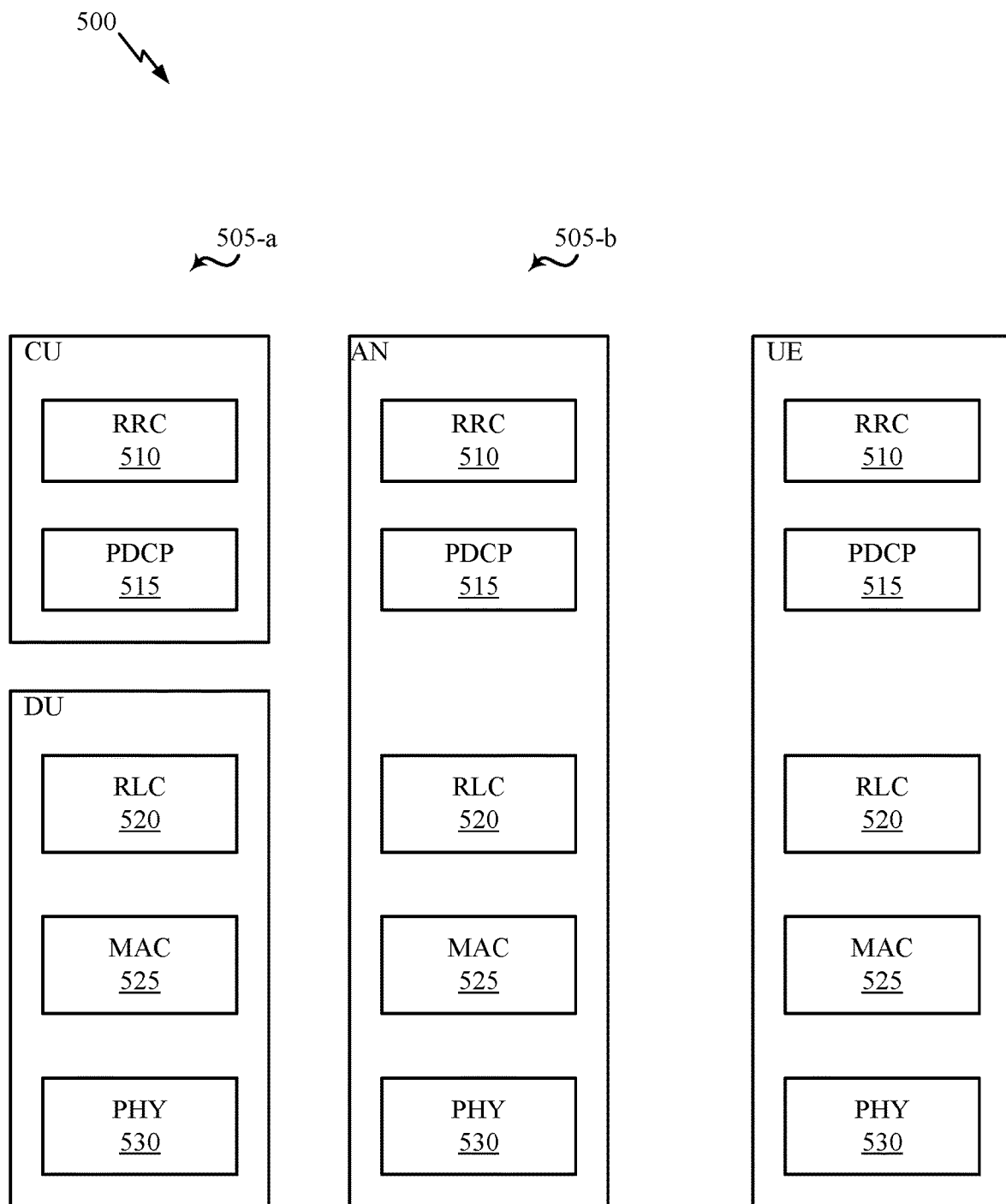
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device. In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
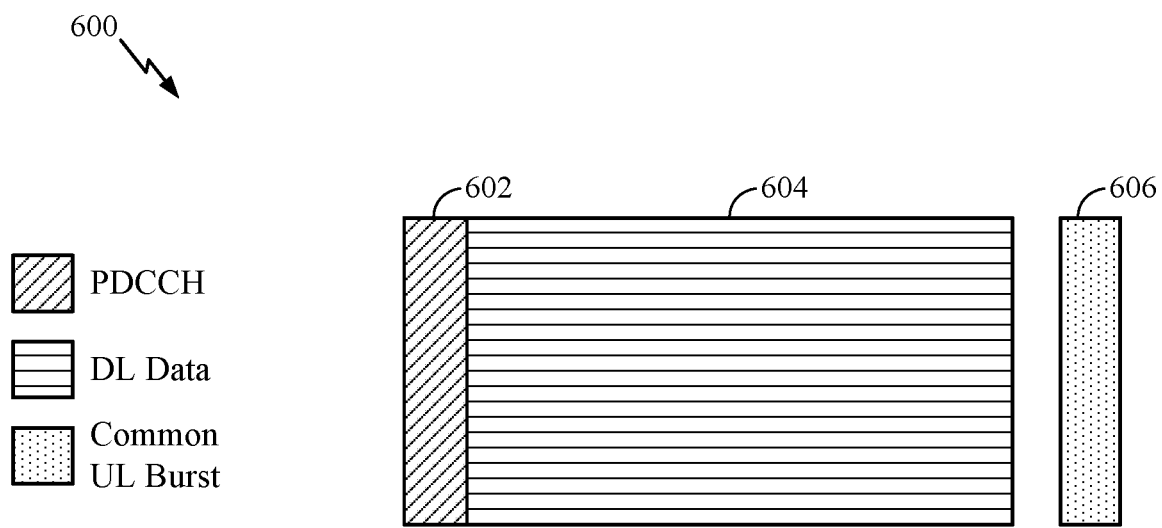
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
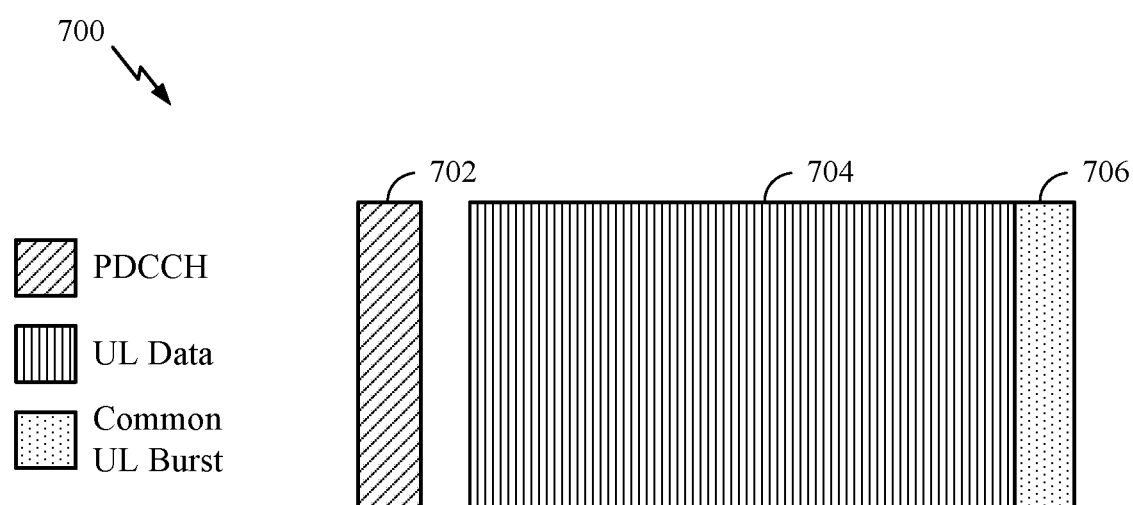
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example of LTE-NR Dual Connectivity

Presently, mobiles devices typically receive data from a single TRP. However, users may experience a poor connection resulting in reduced data throughput, delay, increased battery usage, and other drawbacks. For example, users may be on a cell edge and may experience high inter-cell interference which may limit the data rates. In another example, users may experience scenarios where additional communication capacities would be beneficial. Accordingly, dual connectivity (DC) allows users to transmit and receive data from multiple TRPs independently and/or simultaneously. For example, the UE may send and receive data from two TRPs in two separate streams when the UE is in range of two cell towers in two adjacent cells at the same time. The UE may communicate with the two towers simultaneously when the UE is within either towers' reach. By scheduling two independent data streams to the UE from two different TRPs at the same time, dual connectivity (DC) may exploit network capacities. Further, in another example, the UE may select one of the two TRPs to communicate with depending on the requirements of the UE. This helps improve the user experience while increasing network capacity.

Accordingly, dual connectivity (DC) may have benefits in the cellular industry. For example, DC can significantly improve per-user throughput and mobility robustness by allowing users to be connected simultaneously to an eNB and a gNB. The increase in per-user throughput is achieved by aggregating radio resources from at least two NBs. Moreover, dual connectivity also helps in load balancing between the eNB and the gNB. Further, presently in 5G deployment, an LTE-NR tight interworking architecture with dual connectivity (DC) may be used to avoid areas where NR does not have ubiquitous coverage.

Example of Carrier Aggregation

Further, a UE may have a plurality of wireless connections (e.g., corresponding to communications on different component carriers, frequencies, spatial beams, etc.) with one or more BSs in the network. For example, in carrier aggregation (CA), the UE may communicate in a plurality of cells (e.g., a primary cell (PCell) and one or more secondary cells (SCells)) using a plurality of component carriers (e.g., having the same or different frequencies). The plurality of component carriers may be used for communication with a single BS and/or multiple BSs. In another example, in dual-connectivity, the UE may communicate with multiple BSs using separate connections for each BS. In certain aspects, the UE may have information about the UE and/or the plurality of wireless connections that can be used to determine a configuration of the wireless connections with the network. In certain aspects, the UE may communicate with the one or more BSs using dual radio access technologies (e.g., LTE and NR).

As discussed, one or more BSs (e.g., BSs 110) and a UE (e.g., UE 120) in a network (e.g., wireless network 100) may support multiple access technologies (e.g., dual-connectivity, CA, etc.). For example, the UE 120 may form a plurality of wireless connections (e.g., corresponding to communications on different component carriers, frequencies, spatial beams, etc.) with the network 100 via one or more BSs 110. In some cases, configuration of the plurality of wireless connections for communication by the UE 120 with the network 100 is determined by the network 100 (e.g., BSs 110) itself, and not by the UE 120.

For example, in certain aspects, one or more BSs 110 and UE 120 may support CA, meaning the BSs 110 and UE 120 can communicate over multiple frequencies (e.g., multiple ranges of frequencies of one or more bandwidths) referred to as carriers, or component carriers (CCs). These carriers may or may not be contiguous in frequency. When CA is used by the BSs 110, the BSs 110 supports a plurality of serving cells, one for each carrier. The coverage area of each serving cell may differ. In certain aspects, radio resource control (RRC) connection procedures (e.g., during handover, after a radio link failure (RLF), for initial connection, etc.) for the UE 120 connecting to the BSs 110 are handled by the BSs 110 using only one of the carriers (referred to as a primary carrier), which serves one of the cells referred to as the primary cell (PCell). The remaining cells are referred to as secondary cells (SCells) and are served by the remaining carriers (referred to as secondary carriers).

Example Techniques for Power Control

In certain aspects, a UE 120 may have multiple modems for communicating using multiple RATs (e.g., LTE and NR). For example, in certain aspects, the UE 120 includes a first modem for communicating using a first RAT (e.g., NR), and a second modem for communicating using a second RAT (e.g., LTE). Though certain aspects are described herein with respect to the UE 120 including a modem for NR communications and a modem for LTE communications, it should be noted that similar techniques may be used for other RATs, or other numbers of RATs.

The UE 120 may be configured to use a first modem for communicating on a UL (referred to as a NR UL) using NR and a second modem for communicating on a UL (referred to as a LTE UL) using LTE. In certain aspects, the UE 120 communicates with a first BS 110 on the NR UL and a second BS 110 on the LTE UL. It should be noted that the first BS 110 and the second BS 110 may be collocated geographically, in separate physical locations, in the same physical device, etc. It should further be noted that, in certain aspects, the UE 120 may use carrier aggregation for one or both of the NR UL and LTE UL. For example, the UE 120 may communicate on multiple carriers for the NR UL. In certain aspects, communications on the NR UL and LTE UL by the UE 120 may be on the same or different carriers.

In certain aspects, UE 120 may be configured (e.g., by a network component (e.g., BS 110)) with an overall maximum output power parameter (e.g., a nominal maximum power referred to as P_cmax). P_cmax may be indicative of an overall power limit for the UE 120 to attempt to transmit on all ULs at a given time. In certain aspects, communication between the modems of the UE 120 (e.g., internally within the UE 120) may be slow. This may be problematic as the modems may not be able to quickly exchange information about the transmit power being used by each modem for communicating on a respective UL. Accordingly, the aggregate transmit power of all the modems of the UE 120 max exceed P_cmax. For example, the first modem of the UE 120 may transmit at a first power level at the same time that the second modem of the UE 120 transmits at a second power level. The first modem may not be aware of the second modem transmitting at the second power level and vice versa, due to the slow communication between them, and therefore the sum of the first power level and the second power level may exceed P_cmax. Further, intermodulation between the different ULs of the UE 120 may require that the UE transmit on different ULs in a time division multiplexed (TDM) fashion.

In certain aspects, UE 120 may be configured (e.g., by a network component (e.g., BS 110)) with separate RAT specific maximum output power parameters (e.g., a nominal maximum power for communicating using NR referred to as P_NR, and a nominal maximum power for communicating using LTE referred to as P_LTE). Accordingly, for NR UL communications, the UE 120 may limit transmit power to P_NR, and for LTE UL communications, the UE 120 may limit transmit power to P_LTE.

In certain aspects, P_LTE and P_NR are configured as values up to P_cmax. In certain aspects, P_LTE+P_NR=P_cmax. In certain aspects, P_LTE+P_NR>P_cmax. In certain aspects, the wireless network 100 may configure the UE 120 (e.g., via BS 110) to prioritize or reserve certain transmission power of the power limit (e.g., P_cmax). In certain aspects, where P_LTE+P_NR>P_cmax, UE 120's total transmit power (e.g., P_LTE+P_NR while transmitting simultaneously on the LTE UL and NR UL) may exceed P_cmax (e.g., when DL/UL LTE TTI/reduced UE processing time based operation is not configured for the UE 120). In certain such aspects, the UE 120 may be configured to scale down the power used for transmission on the NR UL to meet the P_cmax power limit or even drop the NR UL transmission. Where the NR UL communications are on two or more UL carriers, the power scaling or drop of NR UL transmission may be done separately or jointly for the two or more UL carriers.

In certain aspects, when P_NR<P_cmax, the UE 120 may be configured to transmit on the NR UL up to P_cmax when the UE 120 determines there is no LTE UL transmission at the same time as the NR UL transmission (e.g., based on semi-static configuration (e.g., received from BS 110) at the UE 120, such as based on a measurement gap, DL/UL configuration, etc).

As discussed, in certain aspects, UE 120 may be configured to communicate on multiple different carriers on the UL. In certain aspects, the UE 120 may use one or more different carriers for communicating on the NR UL than for communication on the LTE UL. In certain such aspects, the UE 120 may be configured to operate on only one of the carriers at a time, meaning it may transmit on only one of the LTE UL or the NR UL at a time. In certain aspects, for the carrier used for LTE UL transmissions by the UE 120, the UE 120 can be configured with downlink reference signals (RSs) that indicate when the UE 120 can transmit on the LTE UL. For example, the UE 120 can be configured with DL-reference UL/DL configuration. The DL-reference UL/DL configuration may be defined for LTE-FDD-SCell in LTE-TDD-FDD CA with LTE-TDD-PCell.

In certain aspects, for scheduling UL transmission/HARQ timing of a LTE FDD carrier on the UL, DL-reference UL/DL configuration defined for LTE-FDD-SCell in LTE-TDD-FDD CA with LTE-TDD-PCell is applied. In certain aspects, the UE 120 is configured to be able to transmit NR UL transmissions at least in the subframe(s) where LTE UL transmission is not allowed (e.g., scheduled) based on the DL-reference UL/DL configuration.

In certain aspects, the network 100 (e.g., via a BS 110) is configured to utilize DL/UL TDM (e.g., on a per-UE basis) (e.g., to avoid self-interference due to harmonics). UE 120 may be scheduled for NR UL or LTE UL transmission in an arbitrary time slot. Similarly, UE 120 may be scheduled for NR DL or LTE DL transmission in an arbitrary time slot. In certain aspects, where the UE 120 is configured with multiple UL carriers, but assumed to only operate on one UL carrier at a time, the UE 120 can be scheduled for NR UL transmission in an arbitrary slot.

In certain aspects, such as where both 1) when P_NR<P_cmax, the UE 120 is configured to transmit on the NR UL up to P_cmax when the UE 120 determines there is no LTE UL transmission at the same time as the NR UL transmission (e.g., based on semi-static configuration (e.g., received from BS 110) at the UE 120, such as based on a measurement gap, DL/UL configuration, etc.); and 2) the DL-reference UL/DL configuration is defined for LTE-FDD-SCell in LTE-TDD-FDD CA with LTE-TDD-PCell, certain issues may arise. For example, in such aspects, the NR modem of the UE 120 may not communicate with the LTE modem of the UE 120. Accordingly, the NR modem does not know the LTE transmission power of the LTE modem.

Further, even where the NR modem does not know the LTE transmission power of the LTE modem, the UE 120 may be scheduled (e.g., by network 100 via BS 110) in any arbitrary time slot to transmit in the NR UL (e.g., when DL/UL TDM is configured at the UE 120). Where the UE 120 is not allowed to exceed P_cmax for transmit power, the UE 120, accordingly may not be able to rely on the BS 110 (e.g., LTE BS 110) for scheduling the UE 120 UL transmissions so as not to exceed P_cmax.

Accordingly, in certain aspects, the UE 120 may be configured such that P_LTE+P_NR<=P_cmax, and the NR UL transmissions from the UE 120 may be scheduled (e.g., by network 100 via BS 110) in any UL TTI (e.g., subframe, slot, etc.).

Additionally or alternatively, in certain aspects, the UE 120 may be configured such that P_LTE+P_NR>P_cmax, and the NR UL transmissions from the UE 120 may not be scheduled (e.g., by network 100 via BS 110) in any UL TTI that is designated (e.g., scheduled) for LTE UL transmissions (e.g., accordingly to the reference TDD configuration (e.g., TDM pattern)).

In some aspects, UE 120 may not support configured TDM pattern in one or more of the following scenarios: 1) LTE FDD CA when an Scell UL has intermodulation problem; 2) LTE TDD CA with different DL/UL configuration when an SCell UL has intermodulation problem; or 3) LTE FDD-TDD CA with FDD PCell UL that has an intermodulation problem.

In some aspects, different TDM patterns may be used to avoid intermodulation problems. For example, for LTE FDD CA when an Scell UL has intermodulation problem, FDD DL HARQ and TDD UL HARQ timing is performed between the UE 120 and the BS 110 serving the FDD SCell. In another example, for LTE FDD-TDD CA with FDD PCell UL that has an intermodulation problem, the UE 120 and BS 110 use a UL reference configuration that is the same as the TDD cells DL-UL configuration.

Figure 8:
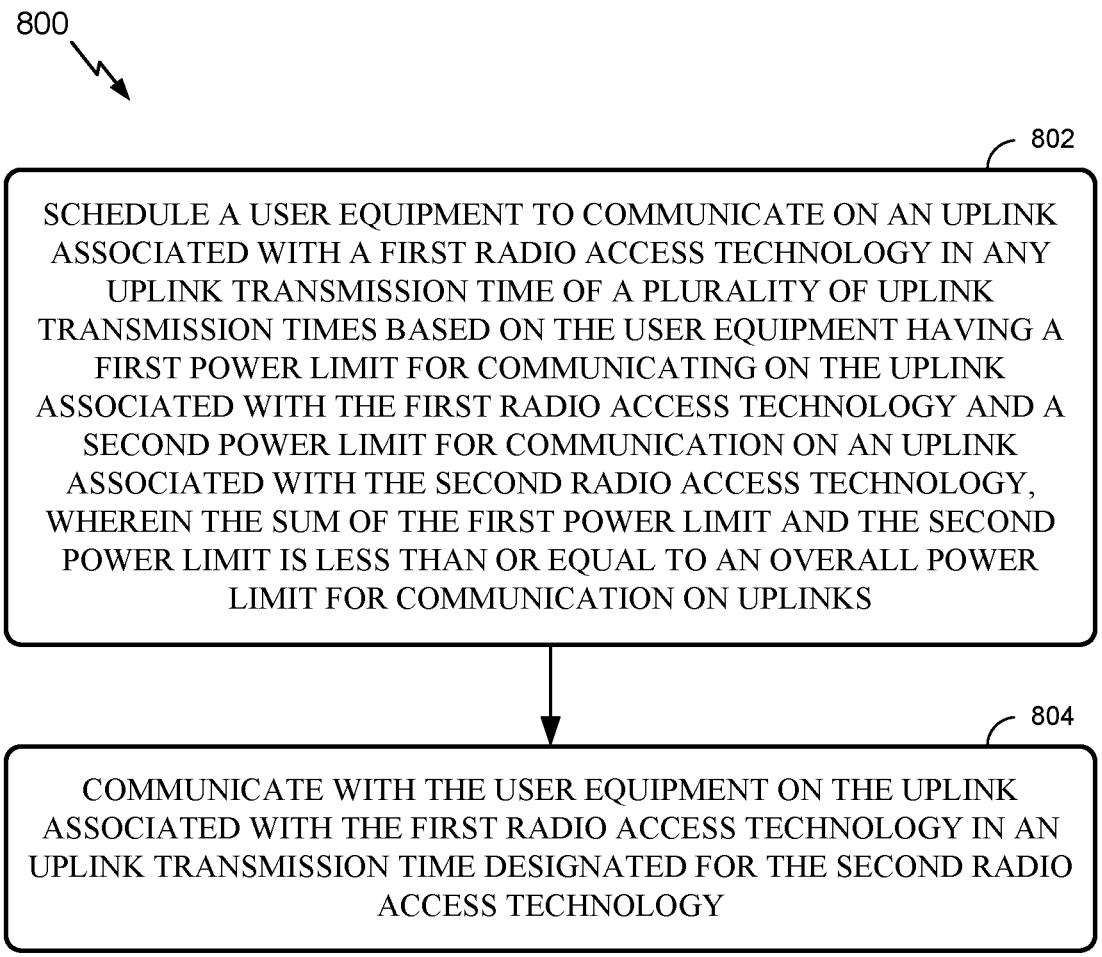
FIG. 8 illustrates example operations for wireless communication by a user equipment (UE) and/or base station (BS), in accordance with aspects of the present disclosure.

FIG. 8 illustrates example operations 800 for wireless communication by a user equipment (UE) and/or BS, in accordance with aspects of the present disclosure. The operations 800 may be performed by, for example, a network entity such as the UE 120 and/or BS 110 of FIG. 1.

The operations 800 begin, at block 802, by scheduling a user equipment to communicate on an uplink associated with a first radio access technology in any uplink transmission time of a plurality of uplink transmission times based on the user equipment having a first power limit for communicating on the uplink associated with the first radio access technology and a second power limit for communication on an uplink associated with the second radio access technology, wherein the sum of the first power limit and the second power limit is less than or equal to an overall power limit for communication on uplinks. At block 804, operations 800 continue by communicating with the user equipment on the uplink associated with the first radio access technology in an uplink transmission time designated for the second radio access technology.

Figure 9:
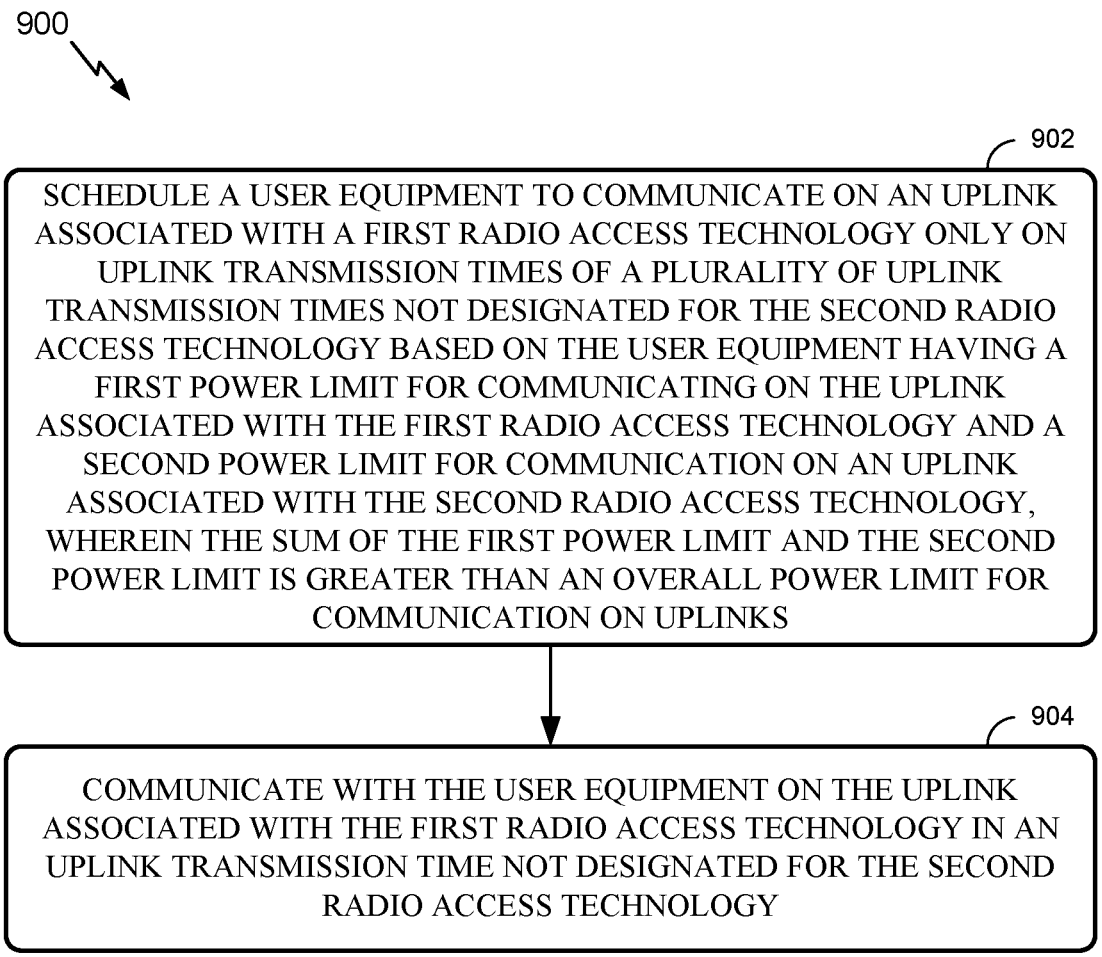
FIG. 9 illustrates example operations for wireless communication by a user equipment (UE) and/or base station (BS), in accordance with aspects of the present disclosure.

FIG. 9 illustrates example operations 900 for wireless communication by a user equipment (UE) and/or BS, in accordance with aspects of the present disclosure. The operations 900 may be performed by, for example, a network entity such as the UE 120 and/or BS 110 of FIG. 1.

The operations 900 begin, at block 902, by scheduling a user equipment to communicate on an uplink associated with a first radio access technology only on uplink transmission times of a plurality of uplink transmission times not designated for the second radio access technology based on the user equipment having a first power limit for communicating on the uplink associated with the first radio access technology and a second power limit for communication on an uplink associated with the second radio access technology, wherein the sum of the first power limit and the second power limit is greater than an overall power limit for communication on uplinks. At block 904, operations 900 continue by communicating with the user equipment on the uplink associated with the first radio access technology in an uplink transmission time not designated for the second radio access technology.

Figure 10:
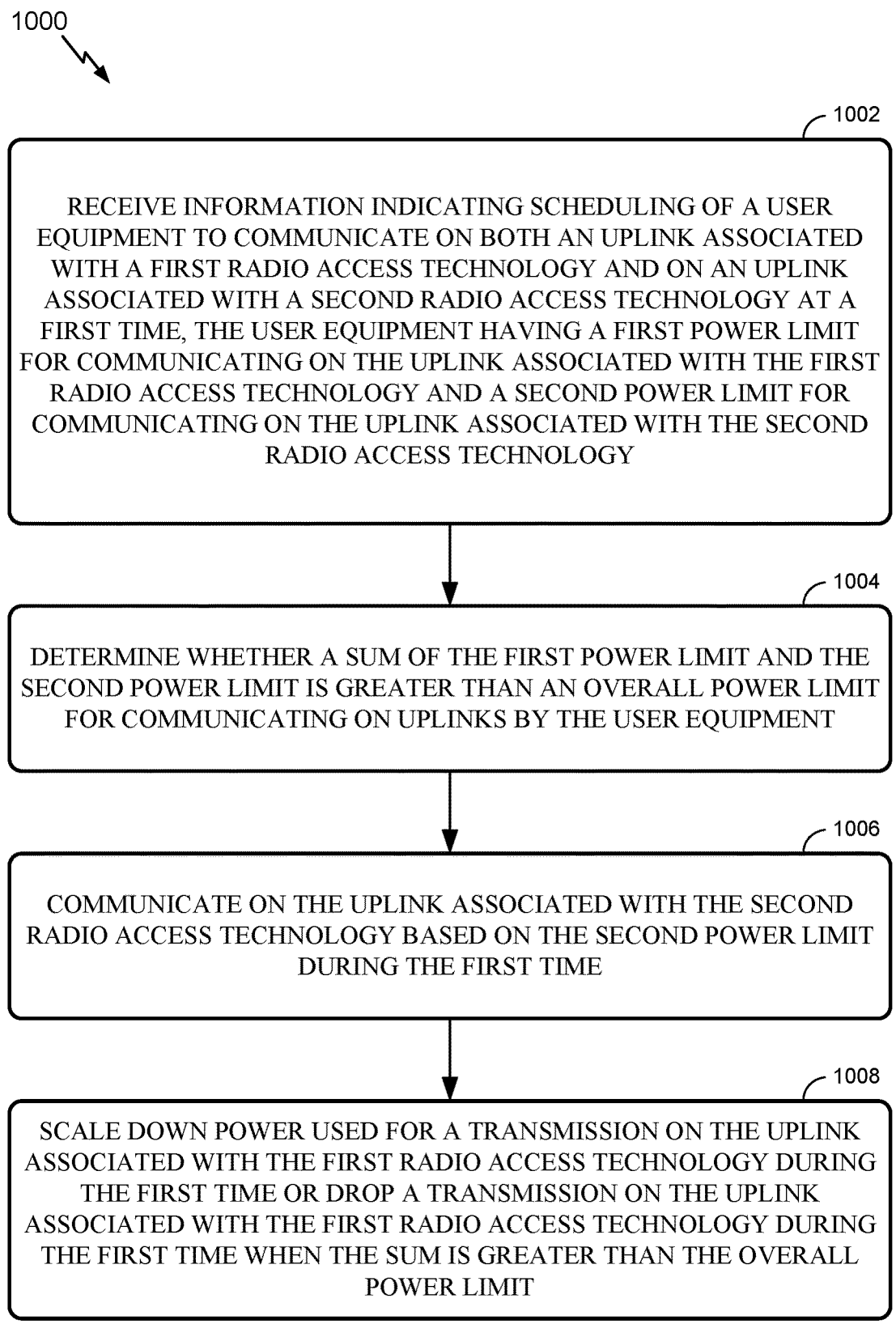
FIG. 10 illustrates example operations for wireless communication by a user equipment (UE), in accordance with aspects of the present disclosure.

FIG. 10 illustrates example operations 1000 for wireless communication by a user equipment (UE), in accordance with aspects of the present disclosure. The operations 1000 may be performed by, for example, the UE 120 of FIG. 1.

The operations 1000 begin, at block 1002, by receiving, at a user equipment, information indicating scheduling of the user equipment to communicate on both an uplink associated with a first radio access technology and on an uplink associated with a second radio access technology at a first time, the user equipment having a first power limit for communicating on the uplink associated with the first radio access technology and a second power limit for communicating on the uplink associated with the second radio access technology. At block 1004, operations 1000 continue by determining whether a sum of the first power limit and the second power limit is greater than an overall power limit for communicating on uplinks by the user equipment.

At block 1006, operations 1000 continue by communicating, by the user equipment, on the uplink associated with the second radio access technology based on the second power limit during the first time. At block 1008, operations 1000 continue by scaling down power used for a transmission on the uplink associated with the first radio access technology during the first time or dropping a transmission on the uplink associated with the first radio access technology during the first time when the sum is greater than the overall power limit.

Figure 11:
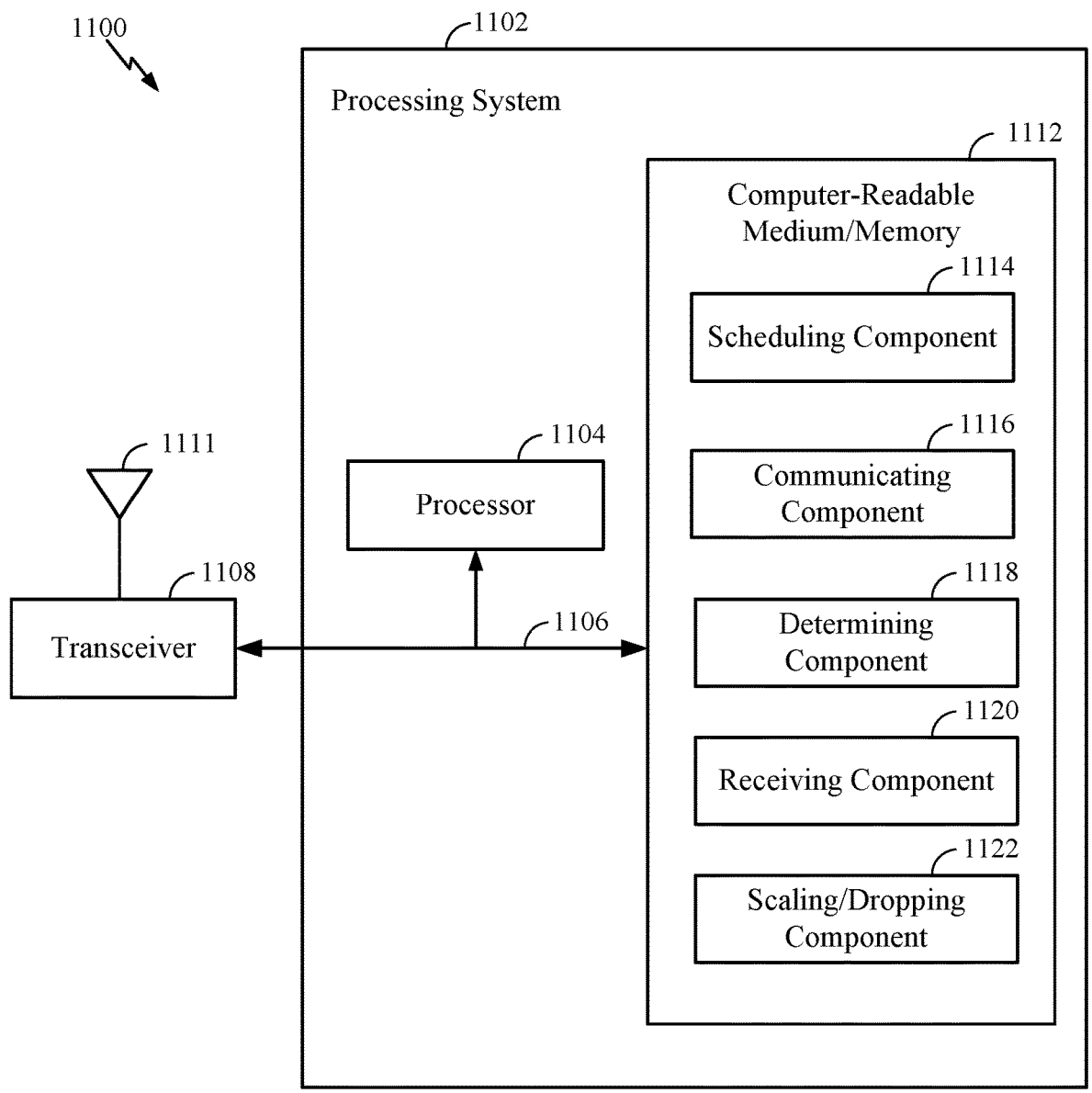
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIGS. 8 9, and/or 10. The communications device 1100 includes a processing system 1102 coupled to a transceiver 1108. The transceiver 1108 is configured to transmit and receive signals for the communications device 1100 via an antenna 1111, such as the various signal described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions that when executed by processor 1104, cause the processor 1104 to perform the operations illustrated in FIGS. 8, 9, and/or 10, or other operations for performing the various techniques discussed herein.

In certain aspects, the processing system 1102 further includes a scheduling component 1114 for performing the operations illustrated in FIGS. 8 and/or 9 or other scheduling operations. Additionally, the processing system 1102 includes a communicating component 1116 for performing the operations illustrated in FIGS. 8, 9, and/or 10 or other communicating operations. Additionally, the processing system 1102 includes a determining component 1118 for performing determining operations. Additionally, the processing system 1102 includes a receiving component 1120 for performing receiving operations. Further, the processing system 1102 includes a scaling/dropping component 1122. The scheduling component 1114, communicating component 1116, determining component 1118, receiving component 1120, and scaling/dropping component 1122 may be coupled to the processor 1104 via bus 1106. In certain aspects, the scheduling component 1114, communicating component 1116, determining component 1118, receiving component 1120, and scaling/dropping component 1122 may be hardware circuits. In certain aspects, the scheduling component 1114, communicating component 1116, determining component 1118, receiving component 1120, and scaling/dropping component 1122 may be software components that are executed and run on processor 1104.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a UE 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in the appended figures.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment, comprising:
    receiving, at the user equipment, first information indicating: (i) an overall power limit for communicating on uplinks by the user equipment at a first time, (ii) a first power limit for communicating on an uplink associated with a first radio access technology, and (iii) a second power limit for communicating on an uplink associated with a second radio access technology, the first information provided by at least one base station;
    receiving, at the user equipment, second information indicating scheduling of the user equipment to communicate on both the uplink associated with the first radio access technology and on the uplink associated with the second radio access technology at the first time;
    determining whether a sum of the first power limit and the second power limit is greater than the overall power limit;
    communicating, by the user equipment, on the uplink associated with the second radio access technology based on the second power limit during the first time; and
    scaling down power used for a transmission on the uplink associated with the first radio access technology during the first time or dropping the transmission on the uplink associated with the first radio access technology during the first time when the sum is greater than the overall power limit.

2. The method of claim 1, further comprising communicating, by the user equipment, on the uplink associated with the first radio access technology based on the first power limit when the sum is not greater than the overall power limit.

3. The method of claim 1, wherein the first radio access technology comprises new radio (NR) and the second radio access technology comprises long term evolution (LTE).

4. The method of claim 1, wherein communicating, by the user equipment, on the uplink associated with the second radio access technology comprises communicating utilizing frequency-division duplex (FDD) downlink (DL) hybrid automatic repeat request (HARQ) and time-division duplex (TDD) uplink (UL) HARQ timing in a cell serving the second radio access technology.

5. The method of claim 1, wherein communicating, by the user equipment, on the uplink associated with the second radio access technology comprises communicating utilizing an uplink (UL) configuration based on a time-division duplex (TDD) uplink-downlink (DL-UL) configuration of a cell serving the second radio access technology.

6. A user equipment comprising:
    a memory; and
    a processor coupled to the memory, the processor being configured to:
        receive first information indicating: (i) an overall power limit for communicating on uplinks by the user equipment at a first time, (ii) a first power limit for communicating on an uplink associated with a first radio access technology, and (iii) a second power limit for communicating on an uplink associated with a second radio access technology, the first information provided by at least one base station;
        receive second information indicating scheduling of the user equipment to communicate on both the uplink associated with the first radio access technology and on the uplink associated with the second radio access technology at the first time;
        determine whether a sum of the first power limit and the second power limit is greater than the overall power limit;
        communicate on the uplink associated with the second radio access technology based on the second power limit during the first time; and
        scale down power used for a transmission on the uplink associated with the first radio access technology during the first time or drop the transmission on the uplink associated with the first radio access technology during the first time when the sum is greater than the overall power limit.

7. The user equipment of claim 6, wherein the processor is further configured to communicate on the uplink associated with the first radio access technology based on the first power limit when the sum is not greater than the overall power limit.

8. The user equipment of claim 6, wherein the first radio access technology comprises new radio (NR) and the second radio access technology comprises long term evolution (LTE).

9. The user equipment of claim 6, wherein to communicate on the uplink associated with the second radio access technology comprises to communicate utilizing frequency-division duplex (FDD) downlink (DL) hybrid automatic repeat request (HARQ) and time-division duplex (TDD) uplink (UL) HARQ timing in a cell serving the second radio access technology.

10. The user equipment of claim 6, wherein to communicate on the uplink associated with the second radio access technology comprises to communicate utilizing an uplink (UL) configuration based on a time-division duplex (TDD) uplink-downlink (DL-UL) configuration of a cell serving the second radio access technology.

11. A user equipment comprising:
    means for receiving first information indicating: (i) an overall power limit for communicating on uplinks by the user equipment at a first time, (ii) a first power limit for communicating on an uplink associated with a first radio access technology, and (iii) a second power limit for communicating on an uplink associated with a second radio access technology, the first information provided by at least one base station;

means for receiving second information indicating scheduling of the user equipment to communicate on both the uplink associated with the first radio access technology and on the uplink associated with the second radio access technology at the first time;

means for determining whether a sum of the first power limit and the second power limit is greater than the overall power limit;

means for communicating on the uplink associated with the second radio access technology based on the second power limit during the first time; and means for scaling down power used for a transmission on the uplink associated with the first radio access technology during the first time or dropping the transmission on the uplink associated with the first radio access technology during the first time when the sum is greater than the overall power limit.

12. The user equipment of claim 11, further comprising means for communicating on the uplink associated with the first radio access technology based on the first power limit when the sum is not greater than the overall power limit.

13. The user equipment of claim 11, wherein the first radio access technology comprises new radio (NR) and the second radio access technology comprises long term evolution (LTE).

14. The user equipment of claim 11, wherein means for communicating on the uplink associated with the second radio access technology comprises means for communicating utilizing frequency-division duplex (FDD) downlink (DL) hybrid automatic repeat request (HARQ) and time-division duplex (TDD) uplink (UL) HARQ timing in a cell serving the second radio access technology.

15. The user equipment of claim 11, wherein means for communicating on the uplink associated with the second radio access technology comprises means for communicating utilizing an uplink (UL) configuration based on a time-division duplex (TDD) uplink-downlink (DL-UL) configuration of a cell serving the second radio access technology.

16. A non-transitory computer readable storage medium that stores instructions that when executed by a user equipment (UE) causes the UE to perform a method for wireless communication, the method comprising:

receiving, at the user equipment, first information indicating: (i) an overall power limit for communicating on uplinks by the user equipment at a first time, (ii) a first power limit for communicating on an uplink associated with a first radio access technology, and (iii) a second power limit for communicating on an uplink associated with a second radio access technology, the first information provided by at least one base station;

receiving, at the user equipment, second information indicating scheduling of the user equipment to communicate on both the uplink associated with the first radio access technology and on the uplink associated with the second radio access technology at the first time;

determining whether a sum of the first power limit and the second power limit is greater than overall power limit;

communicating, by the user equipment, on the uplink associated with the second radio access technology based on the second power limit during the first time; and scaling down power used for a transmission on the uplink associated with the first radio access technology during the first time or dropping the transmission on the uplink associated with the first radio access technology during the first time when the sum is greater than the overall power limit.

17. The non-transitory computer readable storage medium of claim 16, wherein the method further comprises communicating, by the user equipment, on the uplink associated with the first radio access technology based on the first power limit when the sum is not greater than the overall power limit.

* * * * *